(12) United States Patent
Bertram et al.

(10) Patent No.: US 12,004,699 B2
(45) Date of Patent: Jun. 11, 2024

(54) CLEANING DEVICE AND METHOD FOR OPERATING A CLEANING DEVICE

(71) Applicant: Miele & Cie. KG, Guetersloh (DE)

(72) Inventors: Andre Bertram, Bielefeld (DE); Tobias Dahms, Hannover (DE); Ralph Steinmeier, Herford (DE); Andreas Nierling, Melle (DE); Eugen Sgurski, Bielefeld (DE); Martin Dettmer, Bielefeld (DE); Michael Reilmann, Bielefeld (DE); Andre Kornfeld, Rheda-Wiedenbrueck (DE)

(73) Assignee: MIELE & CIE. KG, Guetersloh (DE)

( * ) Notice: Subject to any disclaimer, the term of this patent is extended or adjusted under 35 U.S.C. 154(b) by 231 days.

(21) Appl. No.: 16/611,491

(22) PCT Filed: May 18, 2018

(86) PCT No.: PCT/EP2018/063116
§ 371 (c)(1),
(2) Date: Nov. 7, 2019

(87) PCT Pub. No.: WO2018/215343
PCT Pub. Date: Nov. 29, 2018

(65) Prior Publication Data
US 2020/0187749 A1 Jun. 18, 2020

(30) Foreign Application Priority Data

May 23, 2017 (DE) ..................... 10 2017 111 187.5
Sep. 1, 2017 (DE) ..................... 10 2017 120 157.2
(Continued)

(51) Int. Cl.
*A47L 15/42* (2006.01)
*D06F 39/00* (2024.01)

(52) U.S. Cl.
CPC ....... *A47L 15/4291* (2013.01); *A47L 15/4209* (2016.11); *A47L 15/4285* (2013.01);
(Continued)

(58) Field of Classification Search
CPC ............. A47L 15/4291; A47L 15/4209; A47L 15/4285; A47L 15/4297; A47L 2401/09;
(Continued)

(56) References Cited

U.S. PATENT DOCUMENTS

| | | | | |
|---|---|---|---|---|
| 5,947,135 | A | * 9/1999 | Sumida | C02F 1/4618 68/13 A |
| 2014/0224285 | A1 | * 8/2014 | Ham | A47L 15/4225 137/565.37 |
| 2018/0028042 | A1 | * 2/2018 | Heinle | A47L 15/46 |

FOREIGN PATENT DOCUMENTS

| | | |
|---|---|---|
| CH | 699692 A2 | 3/2010 |
| DE | 10357642 A1 | 7/2005 |

(Continued)

OTHER PUBLICATIONS

Machine translation of JP2007-125198A (Year: 2007).*

*Primary Examiner* — Douglas Lee
(74) *Attorney, Agent, or Firm* — LEYDIG, VOIT & MAYER, LTD.

(57) ABSTRACT

A cleaning device, in particular a dishwasher, includes: a cleaning container having a cleaning chamber and accommodating cleaning material to be cleaned; a heat pump device which has an evaporator arranged inside a heat storage medium tank; and an intermediate storage positioned above the heat storage medium tank, the intermediate storage receiving liquid heat storage medium displaced from the heat storage medium tank.

17 Claims, 9 Drawing Sheets

(30) Foreign Application Priority Data

Sep. 1, 2017 (DE) ..................... 10 2017 120 163.7
Sep. 1, 2017 (DE) ..................... 10 2017 120 171.8
Mar. 12, 2018 (DE) ..................... 10 2018 105 641.9

(52) U.S. Cl.
CPC ........ *A47L 15/4297* (2013.01); *D06F 39/006* (2013.01); *A47L 2401/09* (2013.01); *A47L 2501/01* (2013.01)

(58) Field of Classification Search
CPC ............. A47L 2401/12; A47L 2501/01; A47L 15/0023; D06F 39/006; Y02B 30/52; Y02B 40/00
See application file for complete search history.

(56) References Cited

FOREIGN PATENT DOCUMENTS

| | | | | |
|---|---|---|---|---|
| DE | 102015203532 A1 * | 9/2016 | ......... | A47L 15/4291 |
| DE | 102015203532 A1 | 9/2016 | | |
| EP | 1864603 A1 | 12/2007 | | |
| EP | 2193741 A2 | 6/2010 | | |
| EP | 2471434 A1 | 7/2012 | | |
| EP | 3141176 A1 | 3/2017 | | |
| JP | 2007125198 A * | 5/2007 | ......... | A47L 15/4285 |
| WO | WO-2016134938 A1 * | 9/2016 | ......... | A47L 15/4209 |

* cited by examiner

CLEANING DEVICE AND METHOD FOR OPERATING A CLEANING DEVICE

CROSS-REFERENCE TO PRIOR APPLICATIONS

This application is a U.S. National Phase application under 35 U.S.C. § 371 of International Application No. PCT/EP2018/063116, filed on May 18, 2018, and claims benefit to German Patent Application No. DE 10 2017 111 187.5, filed on May 23, 2017; German Patent Application No. DE 10 2017 120 157.2, filed on Sep. 1, 2017; German Patent Application No. DE 10 2017 120 163.7, filed on Sep. 1, 2017; German Patent Application No. DE 10 2017 120 171.8, filed on Sep. 1, 2017; and German Patent Application No. DE 10 2018 105 641.9, filed on Mar. 12, 2018. The International Application was published in German on Nov. 29, 2018 as WO 2018/215343 under PCT Article 21(2).

FIELD

The invention relates to a method for operating a cleaning device, in particular a washing machine or dishwasher, comprising a cleaning container providing a cleaning chamber, in particular a washing compartment, in particular a washing container and a heat pump device, which has an evaporator arranged inside a heat storage medium tank. The invention further relates to a cleaning device, in particular a washing or dishwasher, in particular a domestic dishwasher, having a cleaning container providing a cleaning chamber and a heat pump device having an evaporator arranged inside a heat storage medium tank.

BACKGROUND

A generic cleaning device is known from EP 3 141 176 A1.

The dishwasher described therein has a washing container which provides a washing compartment. This is accessible on the user side via a loading opening which can be closed in a fluid-tight manner by means of a hinge mounted washing compartment door. In the intended use, the washing container serves to accommodate items to be washed, which can be dishes, cutlery parts and/or the like, for example.

For loading items to be cleaned with washing liquid, the so-called washing liquor, the dishwasher has a spraying device in the interior of the washing container. This spraying device typically provides rotatable mounted spray arms, whereby two or three such spray arms are generally provided. When used as intended, washing liquor is applied to the items to be cleaned by means of rotating spray arms.

The washing liquor discharged from the spraying device during operation impinges on the items to be cleaned and then collects in a collecting pot in the washing container. The collecting pot is connected to a circulation pump on the one hand and to a drain pump on the other. The circulation pump, which circulates the washing liquor fed into the dishwasher during use as intended, serves to apply washing liquor to the spraying device. When a washing program is concluded, the washing liquor is dispensed with and pumped off by means of the drain pump.

As is known, dishwashers can be equipped with a heat pump device in order to reduce the energy consumption, in particular when the washing liquor is heated.

The dishwasher known from EP 3 141 176 A1 has a so-called water-water-heat pump device. When used as intended, heat energy is extracted from a liquid reservoir by such a heat pump device. For this purpose, EP 3 141 176 A1 provides an open water tank which accommodates the evaporator of the heat pump device. During operation, the water stored in the tank as heat transfer medium is cooled as a result of heat energy withdrawal. Such cooling can be carried out until the water has frozen.

A fundamental problem with the use of a water-water heat pump device is that an intended use of the dishwasher with simultaneous use of the heat pump device is only energetically meaningful when the water stored in the water tank and serving as heat transfer medium has a certain minimum temperature. Should the water still be too cool or even frozen after a previous use of the dishwasher, it is necessary to postpone the use of the heat pump device as intended until the minimum temperature of the water has been reached, which can definitely take 24 hours if the water is still frozen. An intended use of the dishwasher using the heat pump device is therefore only possible once per day.

In order to address this problem, it has, among other things, been proposed with EP 3 141 176 A1 to position a heat exchanger inside the water tank. This heat exchanger has a fluidic connection to the washing compartment, so that at the end of a washing program, warm washing liquor can be pumped through the heat exchanger before it is disposed of by pumping away to complete the washing program. The heat exchanger thus permits energy recycling from the still warm, but no longer required, washing liquor to the water stored in the tank.

SUMMARY

In an embodiment, the present invention provides a cleaning device, in particular a dishwasher, comprising: a cleaning container comprising a cleaning chamber and configured to accommodate cleaning material to be cleaned; a heat pump device which has an evaporator arranged inside a heat storage medium tank; and an intermediate storage positioned above the heat storage medium tank, the intermediate storage being configured to receive liquid heat storage medium displaced from the heat storage medium tank.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
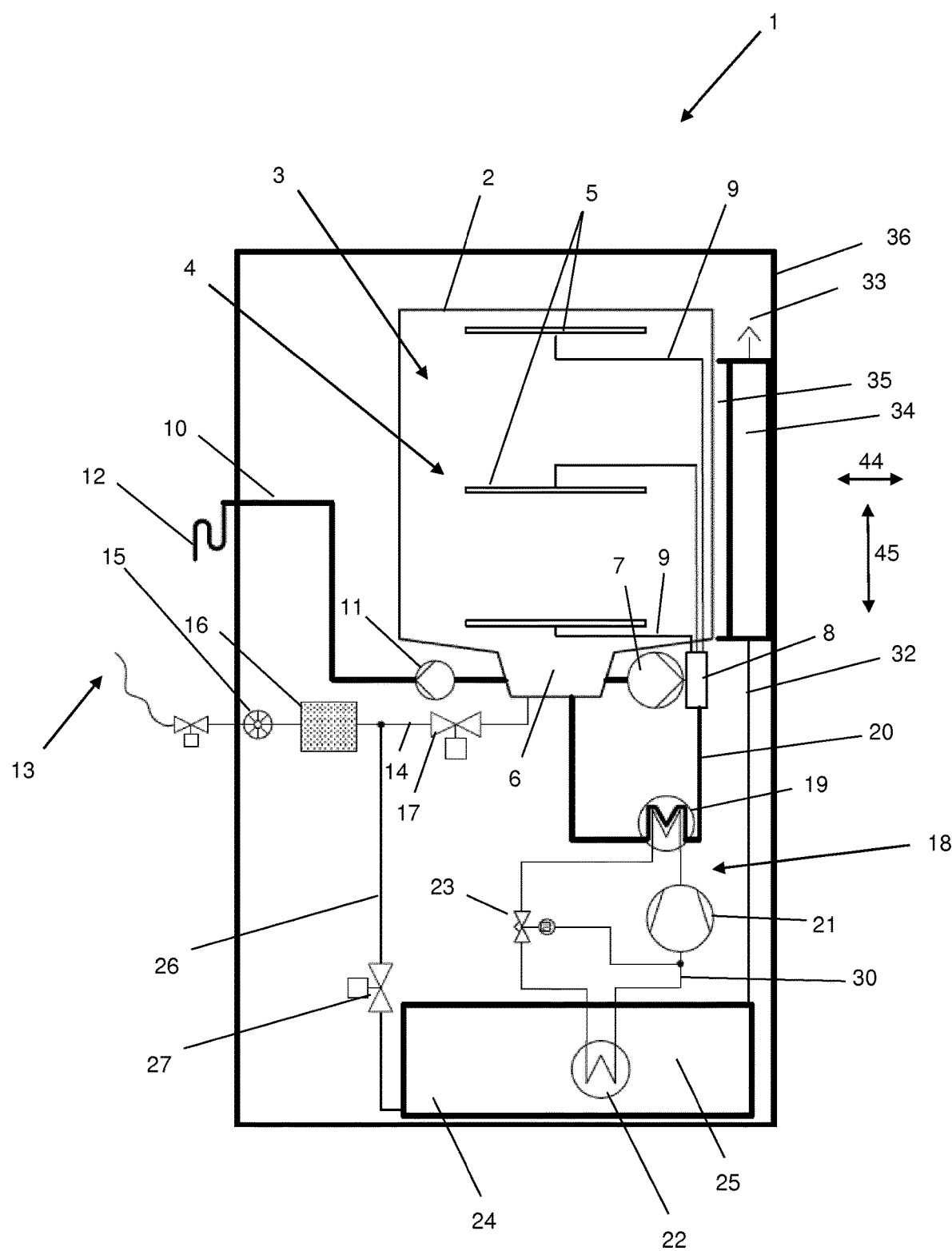
FIGS. 1 to 8 each schematically depict a cleaning device equipped according to the invention in the embodiment as a dishwasher in a respective configuration.

In an embodiment, the present invention provides a cleaning device which is comparatively simple, space-saving and low-maintenance and at the same time permits an energetically effective operation of the cleaning device.

The cleaning device can be a household appliance using water, such as a washing machine, but preferably a dishwasher. The cleaning device comprises a cleaning container providing a cleaning chamber, for example a washing compartment, which serves to accommodate articles to be cleaned, in particular items to be washed, and a heat pump device which has an evaporator arranged inside a heat storage medium tank. In addition, the cleaning device has an intermediate storage. This serves to accommodate the liquid heat storage medium displaced from the heat storage medium tank. The intermediate storage is preferably arranged above the heat storage medium tank in the direction of gravity in the operating position of the cleaning device.

In the operating case of the heat pump device, a heat energy withdrawal results in the cooling of the heat storage medium stored in the heat storage medium tank, which, for example, can be water. The cooling is typically carried out until at least partial solidification, for example, for at least partial icing of the heat storage medium in the heat storage medium tank, i.e. up to a point in time at which at least a partial quantity of the heat storage medium in the heat storage medium tank is in the solidified, e.g. frozen, state. The at least partial solidification causes a volume reduction of the contents of the heat storage medium tank. The inventive intermediate storage device is designed to receive a partial quantity of the heat storage medium tank content, the partial quantity of which is displaced by the volume expansion of the heat storage medium from the heat storage medium tank.

As a result, the heat storage medium tank can be made particularly compact, simple and nevertheless operationally reliable. In particular, the heat storage medium tank can be completely filled with the heat storage medium without fear of the tank bursting due to volume increase upon solidification or icing of the tank contents. The installation space available within the housing of the cleaning device, which is limited in particular in the case of dishwashers, can thus be particularly efficiently utilized. In this case, no increased material requirements are to be observed in the production of the heat storage medium tank. Sensor medium in the heat storage medium tank, in particular a filling level sensor in the heat storage medium tank, can also be dispensed with. Moreover, the transfer of the heat storage medium from the heat storage medium tank into the intermediate accumulator takes place without a pump; no pump is required or present for transferring the heat storage medium from the heat storage medium tank into the intermediate storage; the displacement of heat storage medium into the intermediate storage is effected solely by the volume expansion of the heat storage medium.

In accordance with another feature of the invention, the heat storage medium tank is arranged below the cleaning container, for example in the base region of the cleaning device, in particular in the base region of the dishwasher.

In accordance with a further feature of the invention, the intermediate storage is arranged to the side of the cleaning container or at least partially to the side of the cleaning container, in particular in the space between the cleaning container and the housing of the cleaning device. As a result, an particularly space-saving arrangement of the intermediate accumulator is realized which optimally utilizes the small amount of free space inside the housing. The intermediate storage is arranged, in particular, above the heat storage medium tank which is located below the cleaning container. Heat storage medium tank and intermediate storage are thus preferably arranged relative to one another such that heat storage medium from the intermediate storage can be introduced into the heat storage medium tank by force of gravity. In particular, the heat storage medium which, especially as a result of icing occurring in the heat storage medium tank, has been displaced from the heat storage medium tank and has entered the intermediate storage is returned to the heat storage medium tank due the gravitational force when or as soon as the filling level of the heat storage medium tank permits, for example after ice formed in the heat storage medium tank liquefies again by heating.

In accordance with another feature, the heat storage medium is water, in particular fresh water, and the heat storage medium tank is designed as a water tank. This enables a comparatively simple, inexpensive construction and high operational reliability. Furthermore, it is comparatively easily possible to replenish the heat storage medium tank from the fresh water network when required.

The heat storage medium tank preferably has a volume of 3 to 7 liters, preferably a volume of 3.5 to 5.5 liters. During operation of the cleaning device, the heat storage medium tank is preferably at least almost completely filled, particularly also at room temperature. In other words, the heat storage medium tank is preferably filled with a heat storage medium volume which corresponds to or at least almost corresponds to the volume of the heat storage medium tank. The intermediate storage has a volume between 50 and 550 milliliters, in particular a volume between 250 and 450 milliliters, and/or a volume which corresponds to 5 to 15% of the volume of the heat storage medium tank. Its extent in the width direction of the cleaning device is a multiple smaller than its extent in the height direction and/or in the depth direction of the cleaning device. The extent in the width direction of the cleaning device is, above all, less than 25 mm, preferably 5 to 15 mm.

In accordance with one embodiment of a dishwasher, the volume of the heat storage medium tank designed as a water tank is preferably 1 to 3 times, in particular 1.25 times to 1.75 times, particularly preferably approximately 1.5 times, the water quantity of a washing program section, in particular of the washing program section CLEAN. This can be about 3 liters, for example.

The heat storage medium tank and the intermediate storage can be connected to one another via a tubular or tubular conduit, hereinafter referred to as a displacement line. However, the heat storage medium tank and the intermediate storage can also be designed in one piece and thus jointly form a storage container. Preferably, the collaborative storage container is designed in such a way that the heat storage medium tank is located below the cleaning container and the intermediate storage is arranged to the side of the cleaning container or at least partially to the side of the cleaning container, in particular in the gap space between cleaning container and the housing of the cleaning device.

In accordance with one embodiment of the invention, the heat storage medium tank and the intermediate storage together form a closed system. A closed system is to be understood here as a system whose content is not changed during normal operation of the cleaning device, that is to say in particular in the case of a cleaning program selectable by the user for the articles to be cleaned. In accordance with a further feature, the cleaning device has no fluidic connection, in particular a water line, between the heat storage medium tank designed in particular as a water tank or the intermediate storage on the one hand and the cleaning container on the other. A transfer of the heat storage medium from the heat storage medium tank or the intermediate storage into the cleaning container is thus ruled out. Consequently, no heat storage medium is lost except for a small amount of evaporation. Such a system is particularly robust and low in maintenance and has a particularly low assembly effort.

In accordance with one feature of the invention, the heat storage medium tank is designed as a water tank and can be connected to a domestic water network on-site via a fresh water connection of the cleaning device. This allows simple replenishment of the water tank if necessary. Refilling can take place automatically sensor-controlled.

Another exemplary embodiment of the invention provides that the heat storage medium tank designed as a water tank has a fluidic connection to a fresh water connection on the one hand and, on the other hand, to an overflow pipe opening into the cleaning container. This ensures an energetically efficient process control by virtue of the fact that water with a highest possible water temperature can be supplied to the cleaning container before the heating of the cleaning liquor begins. In the water tank of the heat pump device, water stored in the water tank can thus be supplied to the cleaning tank via the overflow pipe before the beginning of a, in particular first, cleaning program step, in which a heating of the cleaning liquor takes place instead of fresh water which was obtained directly from the domestic water supply device without it being stored. Since, in contrast to fresh water, which typically has a temperature of about 15° C., the water stored in the water tank of the heat pump device can have room temperature, which is typically between 20° C. and 23° C. The water stored in the water tank of the heat pump device is thus typically warmer than fresh water so that less energy is required in the subsequent heating program step to achieve a cleaning liquor target temperature. In this case, the first program step of a cleaning program, in which a heating of the cleaning liquor located in the cleaning container takes place, is carried out by the first or the subsequent program step of cleaning which takes place after an optional pre-rinsing. The water tank thus serves not only as a heat reservoir for the heat pump device, but also as a reservoir for fresh water provided for transfer into the cleaning container. An additional reservoir can thus be dispensed with and more space remains for a larger water tank.

In accordance with another feature, the intermediate storage can be integrated into the overflow pipe opening into the cleaning container. In other words, water is injected from the heat storage medium tank designed as a water tank into the cleaning container with intermediate storage. The intermediate storage thus serves in an efficient and space-saving manner on the one hand for receiving water displaced from the water tank, in particular during or due to the operation of the heat pump device, and on the other hand constitutes a part of the overflow pipe via which water can be admitted from the water tank into the cleaning container. This also results in a particularly compact construction.

In accordance with a further exemplary embodiment, the heat storage medium tank designed as a water tank is connected to a fresh water supply by interposition of the intermediate storage. In this exemplary embodiment, the water tank can thus also be filled with fresh water in a simple manner if required. The intermediate storage is arranged in an efficient and space-saving manner between fresh water supply and water tank or on the inlet side of the water tank. In this exemplary embodiment as well, the water tank can have a fluidic connection to an overflow pipe leading into the cleaning container.

In accordance with a further feature of the invention, the intermediate storage, preferably arranged in the gap space between the cleaning container and the housing of the cleaning device, has an insulation on its side facing the cleaning container. This prevents or minimizes unwanted cooling of the cleaning container by the intermediate storage, in particular when the latter is filled with the cold heat storage medium displaced from the heat storage medium tank during the heat pump operation due to the solidification or icing of the contents of the heat storage medium tank. Efficiency losses are thus avoided. The insulation can be realized by an insulating layer attached to the intermediate storage or to the cleaning container. It can also be realized by an air gap arranged between the cleaning container and the intermediate storage, that is to say a spaced-apart arrangement of cleaning container and buffer. This ensures a thermal decoupling of the cleaning chamber and the intermediate storage. The air gap may be sealed in accordance with another feature so that an air flow into the air gap and out of the air gap is avoided.

Alternatively, the intermediate storage with its side facing the cleaning container, is positioned flat against the latter, i.e. is connected to the latter in a particularly heat-conducting manner. As a result, the intermediate storage filled with cool heat storage medium after operation of the heat pump can support condensation drying within the cleaning chamber; on the other hand, the heat storage medium in the intermediate storage is advantageously heated particularly effectively thereby. This also results in an accelerated heating of the heat storage medium tank and thereby an early reusability of the heat pump is achieved.

In accordance with another feature of the invention, the intermediate storage has no insulation on its side facing away from the cleaning container, i.e. is free of insulation. Instead, the intermediate storage is preferably thermally conductively connected to the housing of the cleaning device. This supports heat transfer from the surroundings of the cleaning device to the heat storage medium accommodated by the intermediate storage. As already described, as a result of a heat energy withdrawal by means of the evaporator arranged in the heat storage medium tank, cooling and a partial solidification or icing and a concomitant volume expansion of the heat transfer medium stored in the heat storage medium tank occur during operation of the heat pump device, whereby a subset of the heat transfer medium is displaced from the heat storage medium tank and enters the intermediate storage. Following the gravitational force, this partial quantity recirculates successively back into the heat storage medium tank if or, as soon as the fill level of the heat storage medium tank permits, for example after ice in the heat storage medium tank liquefies again. The increased heat input that the partial quantity of the heat transfer medium temporarily stored in the intermediate storage has undergone due to the lack of insulation on the side facing away from the cleaning container or the heat-conducting connection to the housing of the cleaning device from the surroundings of the cleaning device thus leads to accelerated reheating of the heat storage medium tank contents. As a result, the heat pump device can already be efficiently operated again at an earlier point in time.

Alternatively, on its side facing away from the cleaning container, the intermediate storage has an insulation which can be attached either to the intermediate storage or to the inner wall of the housing of the cleaning device. The insulation can also be realized by an air gap arranged between the housing wall and the intermediate storage, that is to say a spaced-apart arrangement of the housing wall and the intermediate storage. This avoids a risk of thawing on the housing wall.

In accordance with the invention, in a program step of a cleaning program, a liquid heat storage medium stored in the heat storage medium tank is cooled by operation of the heat pump device to such an extent that a subset of the heat storage medium is displaced from the heat storage medium tank into an intermediate storage. This partial quantity returns, due to the force of gravity, to the heat storage medium tank at a later point in time, in particular in a subsequent program step of the cleaning program or at least partially after completion of the cleaning program.

Preferably, the icing degree in the heat storage medium tank is determined or at least detected whether the degree of icing of the contents of the heat storage medium tank either reaches or exceeds a predetermined limit value or falls below this limit value. This takes place, in particular, immediately at the start of a cleaning program and/or at the beginning of a program step with cleaning liquor to be heated, in particular a cleaning step of CLEANING and/or a program step of RINSING a washing program for a dishwasher. The degree of icing represents the volume fraction of the heat storage medium tank in which the heat storage medium is present in solid or frozen form.

In accordance with another feature of the invention, at least one filling level sensor is located in the intermediate storage and/or in the displacement line connecting the heat storage medium tank to the intermediate storage. This sensor senses the fill level in the intermediate storage and/or in the displacement line or at least detects whether or not a specific filling level is reached or exceeded in the intermediate storage and/or in the displacement line. It can also be designed in such a way that it can be used to measure any fill level in the intermediate storage or in the overflow pipe. The level sensor is connected to a control device of the cleaning device. Depending on the signal of the level sensor, the control device preferably terminates a degree of icing of the heat storage medium tank content or at least determines whether the icing degree of the heat storage medium tank content either reaches or exceeds or falls below a predetermined limit value. The icing degree of the heat storage medium in the heat storage medium tank can thus be monitored in a very simple manner and dispenses with a sensor in the heat storage medium tank. The heat storage medium tank is thus particularly low-maintenance and inexpensive to produce and the assembly of the cleaning device is comparatively simple. In particular, the control device can be configured to change the cleaning program or a cleaning program parameter as a function of the signal of the filling level sensor or—in particular already before the user has selected a cleaning program- to limit the quantity of cleaning programs selectable by the user to a specified subset thereof. The control device can also be designed to switch off or leave the heat pump device switched off in the cleaning program depending on the signal of the fill level sensor, that is to say to completely dispense with operation of the heat pump device in the cleaning program. In this case, the cleaning program-specific heating of the cleaning liquor is effected exclusively by means of another heating device contained in the cleaning device, for example a conventional electric heating device such as a continuous-flow heater located, for example, in the circulating pump circuit. In this case, the control device can also be configured to inform the user of the degree of icing of the heat storage medium tank by means of an acoustic signal, or a parameter representing the degree of icing or correlated therewith, or at least the existing or missing operational readiness or, however, the switching on or off of the heat pump device, in particular already on or performed or provided. Alternatively or in addition, the control device can also be set up to determine or estimate a time duration or a time after which the heat pump is ready for operation again, depending on the signal from the fill level sensor. In particular, this time period or this point in time can be communicated to the user by means of, for example an optical or acoustic display.

The control device can also be configured to control a valve device in the area of the water inlet of the cleaning device in the cleaning program as a function of the signal of the filling level sensor and/or depending on a determined icing degree in the heat storage medium tank designed as a water tank. Depending on the signal of the filling level sensor, the valve device is either set in such a way that the fresh water required for a water inlet in a cleaning program step of the cleaning program is introduced into the cleaning container either directly from the fresh water connection of the cleaning device, i.e. by bypassing the water tank, into which the cleaning container is guided, or the valve direction is set such that fresh water from the device's fresh water connection is guided into the water tank, and the fresh water required for a water inlet in a cleaning program step of the cleaning program is removed completely or partially from the water tank and is guided from there into the cleaning container. The cleaning device can thereby be operated more energy-efficiently. If it is detected by means of the filling level sensor that the water tank is still iced up or is still too severely frozen, i.e. that the degree of icing of the water tank content reaches or exceeds a predetermined limit value, the fresh water for a water inlet in a cleaning program step of the cleaning program is obtained directly, i.e. bypassing the water tank, from the domestic water supply device.

At least one fill level sensor is preferably arranged in each case both in the intermediate storage and in the displacement line, or many fill level sensors are arranged in the intermediate storage and/or in the displacement line. This allows the control device to derive even more accurate information about the degree of icing of the heat storage medium tank content and thereby to control the cleaning device even more energy efficient. In particular, a first level sensor is used for sensing whether or not a first level is reached or exceeded in the intermediate storage and/or in the displacement line and a second level sensor is used for sensing whether or not a second level is reached or exceeded in the intermediate storage and/or in the displacement line. The control device can be set up to carry out a first check in the cleaning program as a function of the signal of the first level sensor and to carry out a second check as a function of the signal of the second level sensor. The first step may be to turn off or leave the heat pump device off, that is to say completely eliminate operation of the heat pump device in the cleaning program, as described above. The second option can be to adjust the valve device setting in the region of the water inlet of the cleaning device, in particular in such a way that fresh water required for a water inlet in a cleaning program step of the cleaning program is taken directly from the on-site water supply means, i.e. bypassing the water tank.

One or more fill level sensors can be designed, for example, as float switches, as optical sensors or as conductance sensors.

In contrast, the positioning of a sensor, in particular of a temperature sensor, in the heat storage medium tank, can advantageously be completely dispensed with, as a result of which the system is comparatively robust and low-maintenance.

In accordance with a further feature of the invention, the cleaning device has a door, with which the cleaning chamber can be closed in a fluid-tight manner. The door is preferably designed to be pivotable about a horizontal axis. A control and/or display device can be fitted to the door, and can be located on the front side or the face side of the door.

FIG. 1 schematically depicts a first exemplary embodiment of the invention. The cleaning device 1 shown here as a dishwasher has a housing 36 which is shown here purely schematically and which accommodates, among other things, a cleaning container 2 embodied as a washing container. The cleaning container 2 in turn provides a cleaning chamber 3 which, during the intended use, serves to accommodate the items to be cleaned or the items to be washed, the so-called loading.

A spraying device 4, which is located inside the washing container 2 serves to cover the items to be cleaned with cleaning liquor. Preferably, such a spraying device 4 has one or more spraying arms 5, which are each rotatable, positioned inside the washing container 2.

The washing compartment 3 opens into a collecting pot 6 of the washing container 2 and to which a circulation pump 7 is connected in a fluidic manner. Via corresponding supply lines 9 the spray arms 5 of the spraying device 4 are connected in a fluidic manner to the circulating pump 7 for example with the interposition of a water guideway switch 8. When used as intended, the spraying device 4 can thus be fed with cleaning liquor by means of the circulating pump 7, whereby the spray arms 5 can be charged as preferred thanks to the water diverter 8.

The dishwasher 1 has, furthermore, a drain 12 via which used and no longer required cleaning liquor is disposed of. For this purpose, a discharge line 10 is provided, which has a fluidic connection to the collecting pot 6 and into which a drain pump 11 is integrated. When the pump 11 is switched on, the cleaning liquor accumulating in the collecting pot 6 can be pumped off via the drain line 10 and thus disposed of.

A fresh water connection 13 is provided for supplying fresh water. The latter has a fresh water line 14 which is connected in a fluidic manner to the collecting pot 6 and into which, for example, an rotating vane meter 15 and a water softener 16 are integrated. A valve 17 makes it possible for the fresh water line 14 to be closed in a fluid-tight manner.

The cleaning device 1 has, furthermore, a heat pump device 18. This has a compressor 21, a condenser 19, an expansion element 23, an evaporator 22 and a flow circuit 30 connecting these components to one another in fluidic manner, in which a working medium is guided.

The evaporator 22 is located within a heat storage medium tank 24, designed as a water tank without restricting the surroundings, which is filled with water 25 as heat transfer medium. The heat storage medium tank 24 is preferably arranged at least substantially below the cleaning container 2 in the direction of gravity, for example in the base of the dishwasher.

When used as intended, the heat pump device 18, a heat transfer from the working medium guided in the flow circuit 30 of the heat pump device 18 to the cleaning liquor takes place with the aid of the condenser 19. For this purpose, a flow circuit 20 is provided which is connected to the circulating pump 7 with interposition of the water diverter 8 and serves to circulate the cleaning liquor. The thermal energy released in the condenser 19 in the operating case by liquefaction of the working medium is thus transferred to the cleaning liquor circulated in the flow circuit 20. The condenser 19 could, however, also be positioned at other locations of the cleaning device at which heat transfer to the washing liquor is possible, for example in the cleaning chamber 3 or in the region of at least one of the supply lines 9.

In accordance with the embodiment shown in FIG. 1 the heat storage medium tank 24 has fluidic connection to the fresh water line 14 via a conduit 26 which, if necessary, allows the heat storage medium tank 24 to be filled with fresh water from the fresh water connection 13. A valve 27 allows fluid-tight sealing of the conduit 26. The fluid connection between the heat storage medium tank 24 and the fresh water connection 13, given by the conduit 26, via which the water is injected into the washing container 2, is only optional. The heat storage medium tank 24 can also have a separate inlet, which is not connected to the fresh water connection 13, by means of which the user can, for example, manually replenish heat storage medium 25, in particular water, into the heat storage medium tank 24.

Figure 3:
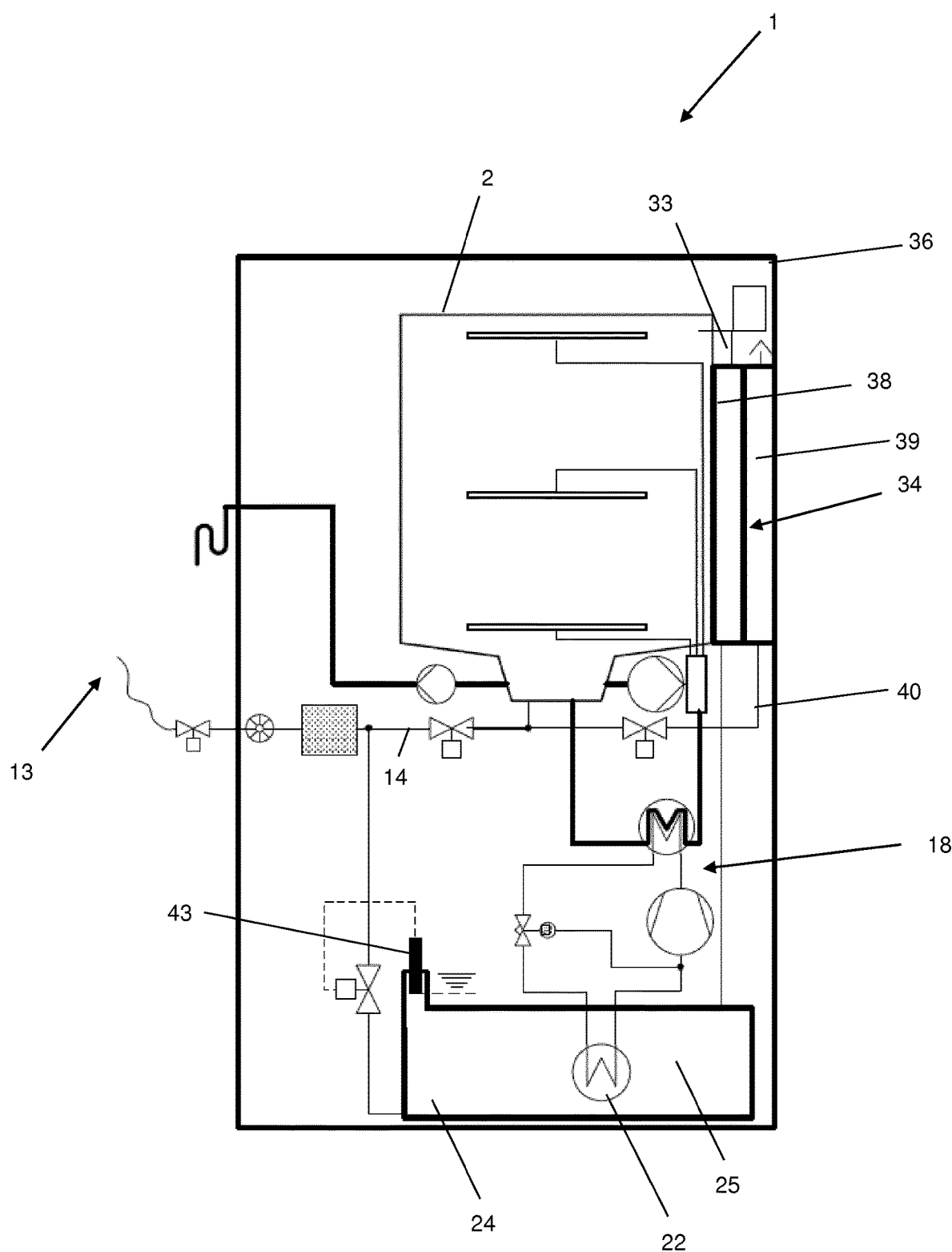
Figure 6:
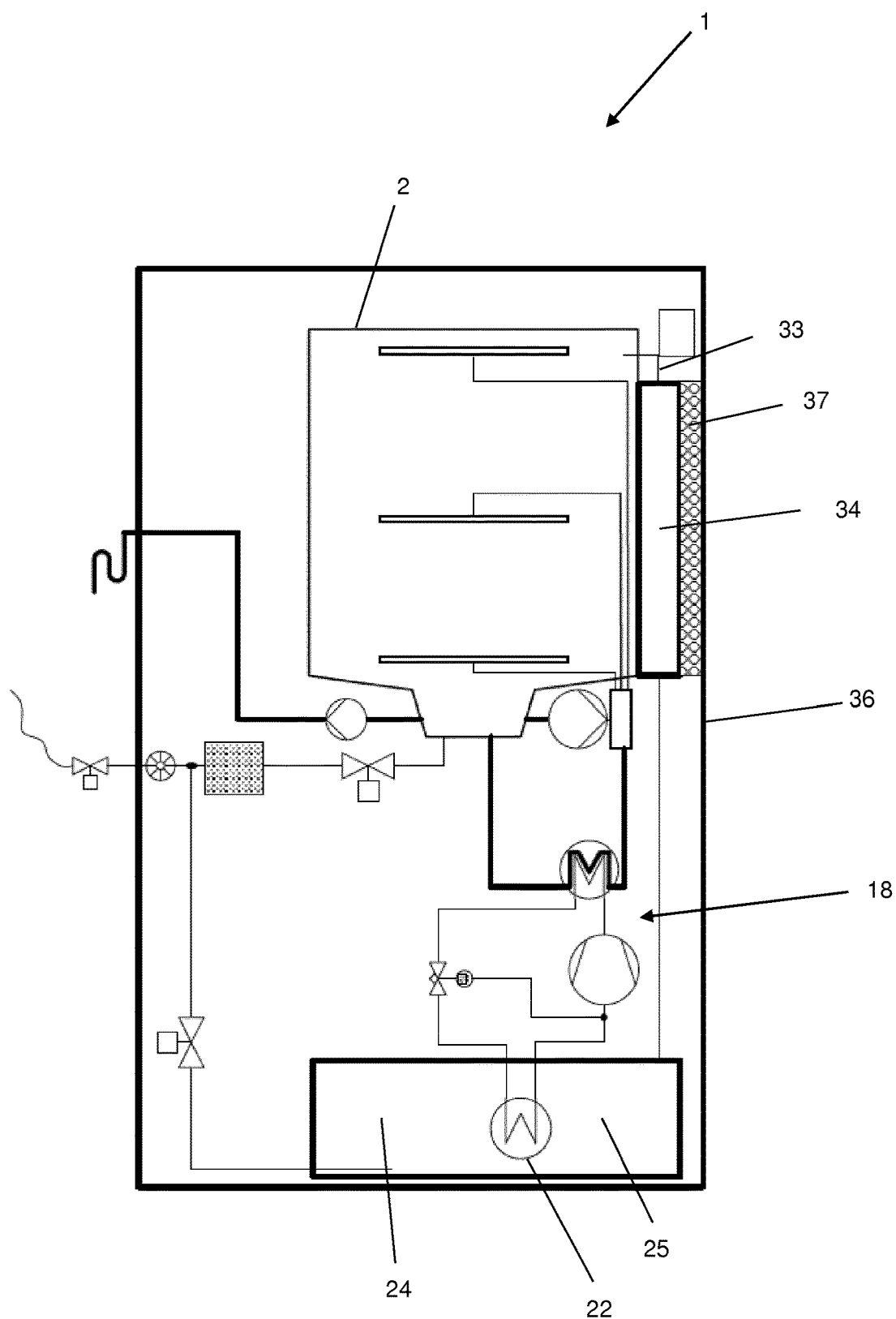

According to the invention, the cleaning device 1 has an intermediate storage 34 for receiving heat storage medium 25 displaced from the heat storage medium tank 24. As shown here, the intermediate storage 34 is positioned to the side or at least partially to the side of the cleaning container 2 namely in the gap space between the housing 36 and the cleaning container 2. It has a vent 33 with which air can escape into the housing of the cleaning device 1 or, as shown in FIG. 3 or FIG. 6 via a conduit into the cleaning container 2. The extent of the intermediate storage 34 in the width direction 44 of the cleaning device 1 is many times smaller than its extent in the height direction 45 and/or in the depth direction of the cleaning device, 1 perpendicular to the sheet plane. The extent in the width direction 44 of the cleaning device 1 is, in particular, less than 25 mm, preferably 5 to 15 mm.

Between the intermediate storage 34 and the cleaning container 2 respectively the side wall of the cleaning container 2, via which the intermediate storage extends, an air gap 35 is provided in accordance with the exemplary embodiment of FIG. 1 which ensures a thermal decoupling of the cleaning chamber 3 and the intermediate storage 34. The intermediate storage 34 and the cleaning container 2 are thus arranged at a distance from one another. An increased energy loss from the cleaning chamber 3 during the heating phases or the operating phases of the heat pump device 18 due to the cool heat storage medium 25 displaced into the intermediate storage 34 is thus avoided. The air gap 35 may, in accordance with one embodiment, be of a sealed design, so that an air flow into the air gap 35 and out of the air gap 35 is avoided.

The heat storage medium tank 24 is connected to the intermediate storage 34 via a displacement line 32.

The embodiment shown in FIG. 1 allows the method according to the invention to be carried out as follows. The heat storage medium tank 24 is always filled with heat storage medium 25, in particular water (in liquid or frozen form) during operation. When the cleaning device 1 is first put into operation, the heat storage medium tank 24 can be filled, for example, from the fresh water connection 13 via the conduit 26 or in some other way. The same applies if a low fill level of the heat storage medium tank 24 is detected during operation, for example due to evaporation. For this purpose, there may optionally be a fill level sensor 43 as shown for example in FIG. 3.

During normal operation of the cleaning device 1 the heat pump 18 is operated to heat the cleaning liquor circulated in the flow circuit 20. During the intended use of the heat pump device 18, at least partial solidification or freezing of the heat storage medium 25 stored in the heat storage medium tank 24 may occur. This results in expansion effects. Bursting of the heat storage medium tank 24 is nevertheless reliably ruled out, since liquid heat storage medium 25 displaced by expansion can flow out of the heat storage medium tank 24 via the displacement line 32 into the intermediate storage 34; this takes place, above all, pump-free. The liquid heat storage medium 25 enters the intermediate storage 34 solely by being displaced by the solidified heat storage medium, such as ice, which forms in the heat storage medium tank 24. The very cool heat storage medium 25 is temporarily stored in the intermediate storage 34. After thawing or melting of solidified heat storage medium, in particular ice, located in the heat storage medium tank 24 the heat storage medium 25 temporarily stored in the intermediate storage 34 can flow back into the heat storage medium tank 24 via the displacement line 32 in particular following gravity. In accordance with this design, heat storage medium 25 is neither lost to the heat storage medium tank 24 nor is ice water introduced into cleaning container 2. In other words, heat storage medium tank 24 and intermediate storage 34 together form a closed system.

Figure 2:
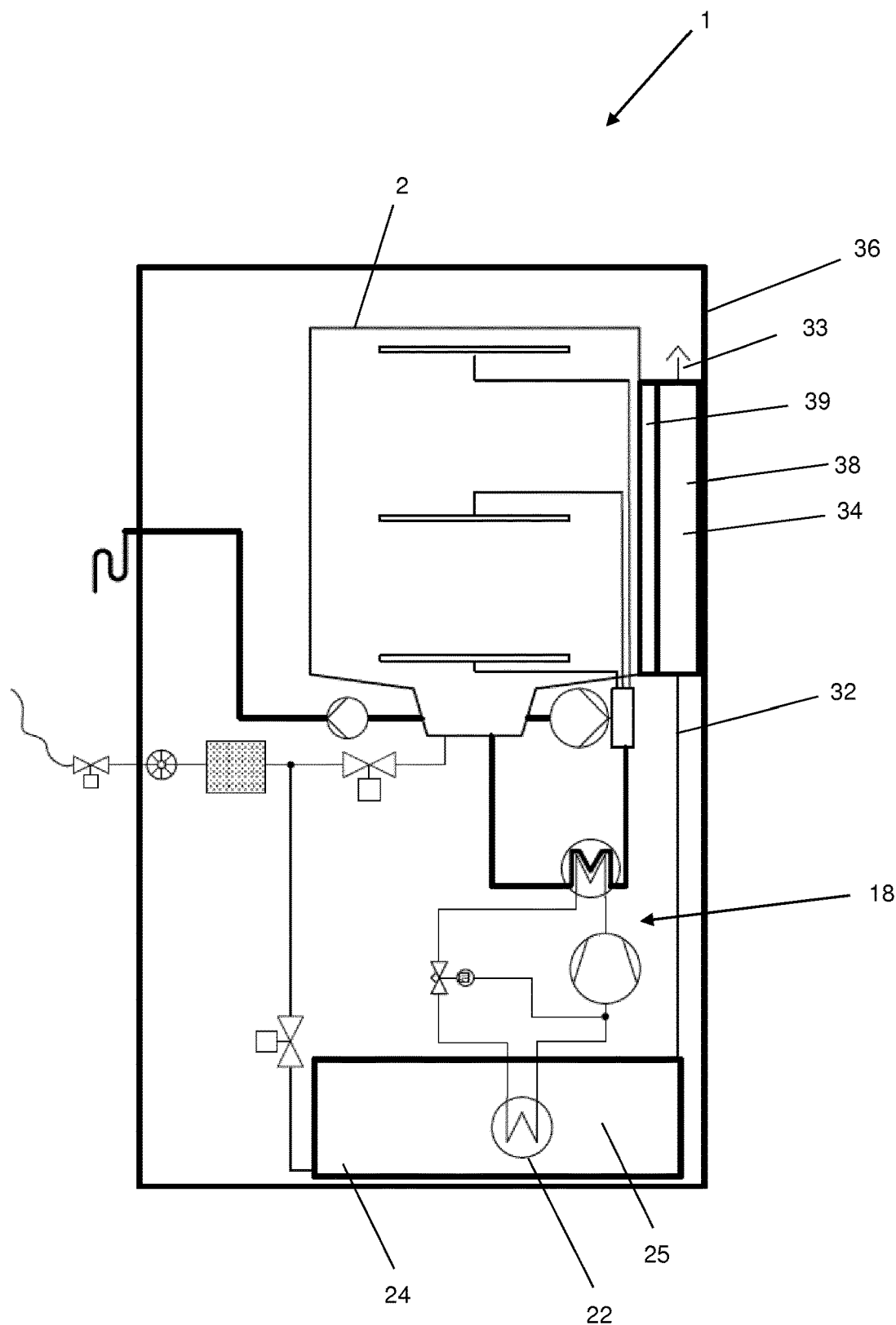

FIG. 2 shows a second embodiment of the invention. It differs only slightly from the exemplary embodiment of FIG. 1 in that the intermediate storage has two chambers 38, 39, wherein the first chamber 38 serves for receiving the water displaced from the heat storage medium tank 24 according to the invention, while the second chamber 39 has an insulating effect with its volume space, which remains in particular free of water. The second chamber 39 is positioned, in particular, between the first chamber 38 and the cleaning container 2. The intermediate storage 34 thus comprises a partition which separates the second chamber 39 from the first chamber 38 and prevents the heat storage medium from passing from the first chamber 38 into the second chamber 39. The second chamber 39 provides for a further improved thermal decoupling of the cleaning chamber 3 and the first chamber 38 of the intermediate storage 34. An increased energy loss from the cleaning chamber 3 during the heating phases or the operating phases of the heat pump device 18 due to the cool water displaced into the first chamber 38 of the intermediate storage 34 is thus avoided. The gap space between the cleaning container 2 and the housing 36 is preferably completely filled in the horizontal direction in the region of the intermediate storage 34 by the intermediate storage 34. In other words, the second chamber 39 of the intermediate storage 34 is positioned directly against a side wall of the cleaning container 2 with its side averted from the first chamber 38. The first chamber 38 of the intermediate storage 34 is positioned with its side averted from the second chamber 39 directly against the housing wall 36 of the cleaning device 1. In this way, a particularly compact arrangement is realized. In addition, a heating of the heat storage medium 25 by thermal energy from the installation space of the cleaning device 2 is accelerated.

FIG. 3 shows another exemplary embodiment in which the intermediate storage 34 according to FIG. 2 likewise has two chambers 38, 39 separated from a vertical separating wall. The first chamber 38 in turn serves for receiving the heat storage medium 25 displaced from the heat storage medium tank 24 according to the invention. In this exemplary embodiment, the second chamber 39 serves (likewise) at least temporarily for storing water, for example fresh water. For this purpose, the second chamber 39 has a fluidic connection via a conduit 40 to the fresh water connection 13 or the fresh water line 14 and/or to the cleaning container 2. In accordance with a first alternative shown here, the first chamber 38 is located between the cleaning container 2 and the second chamber 39; in a second alternative, the second chamber 39 is located between the cleaning container 2 and the first chamber 38.

The second chamber 39 can be used to temporarily store fresh water before introduction into the cleaning container 2 in a manner known per se so that the fresh water is already heated to ambient temperature during the introduction. By integrating the first chamber 38 and the second chamber 39 in a single container, the limited gap-shaped installation space at the side of the cleaning container 2, with this container, can be used to the best possible extent. In this case, the second chamber 39, filled with fresh water, can advantageously bring about an improved heat transfer into the very cool heat storage medium displaced into the first chamber 38 of the intermediate storage 34 during operation of the heat pump 18. This ultimately causes faster heating of the heat storage medium tank contents 25. As a result, the heat pump 18 can be put into use again earlier and operated more efficiently. At the same time, depending on the position, the second chamber 39 acts as an insulating layer, either between the first chamber 38 and the cleaning container 2, as a result of which undesired cooling of the cleaning container 2 can be avoided, or between the first chamber 38 and the housing wall 36, whereby undesired condensation on the housing wall can be avoided.

Figure 4:
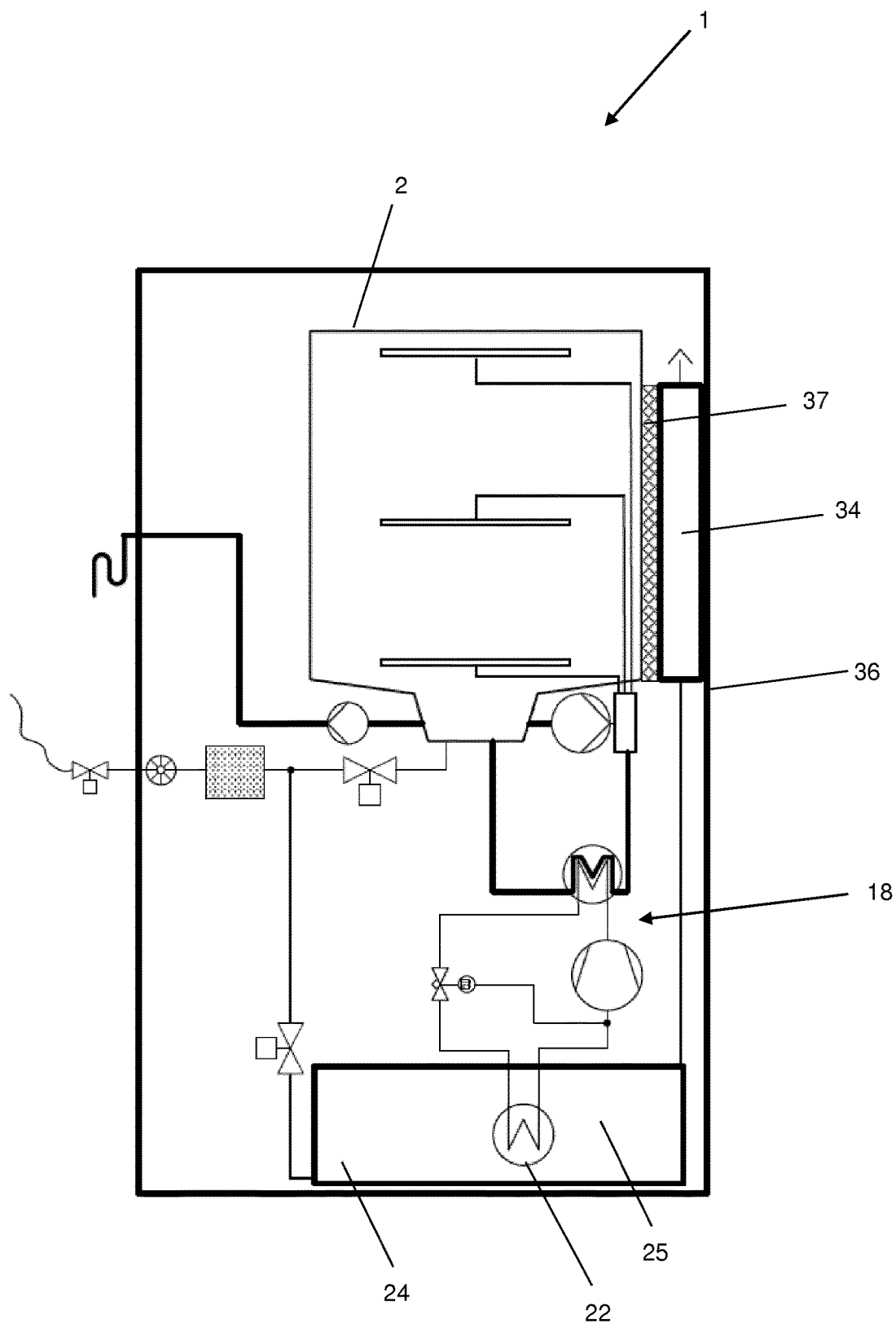

FIG. 4 shows another exemplary embodiment of the invention. It differs only slightly from the exemplary embodiments of FIGS. 1 and 2 in that a thermal barrier layer 37 is positioned between the intermediate storage 34 and the cleaning container 2. This can be attached to the intermediate storage 34 and/or to the cleaning container 2 and preferably completely fills the gap space between the intermediate storage 34 and the cleaning container 2.

Figure 5:
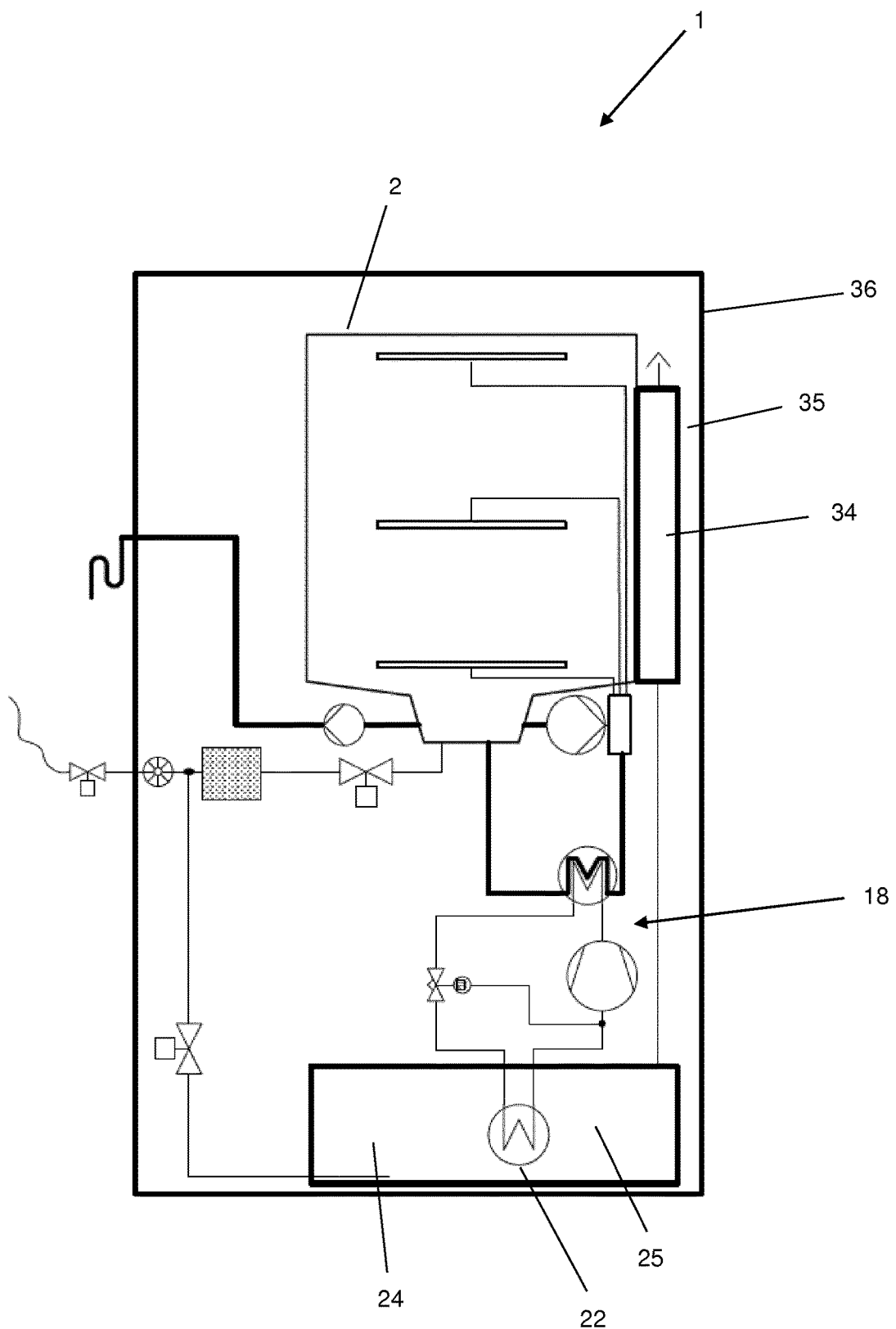

The intermediate storage 34, with its side facing away from the cleaning container 2, can fit against the housing wall 36 of the cleaning device 1 in particular over its entire surface. In order to reliably avoid condensation on the housing outer side, however, the intermediate accumulator 34 can also be designed to be thermally decoupled from the housing wall 36. For instance, an air gap 35 located between the intermediate storage 34 and the housing wall 36 can be provided, as illustrated in FIG. 5. Alternatively or additionally, the intermediate storage 34 can have a thermal barrier layer 37 on this side, that is to say facing away from the cleaning container 2, as shown in FIG. 6. This can be fitted to the intermediate storage 34 and/or to the housing wall 36 and preferably completely fills the gap space between the intermediate storage 34 and the housing wall 36.

Figure 7:
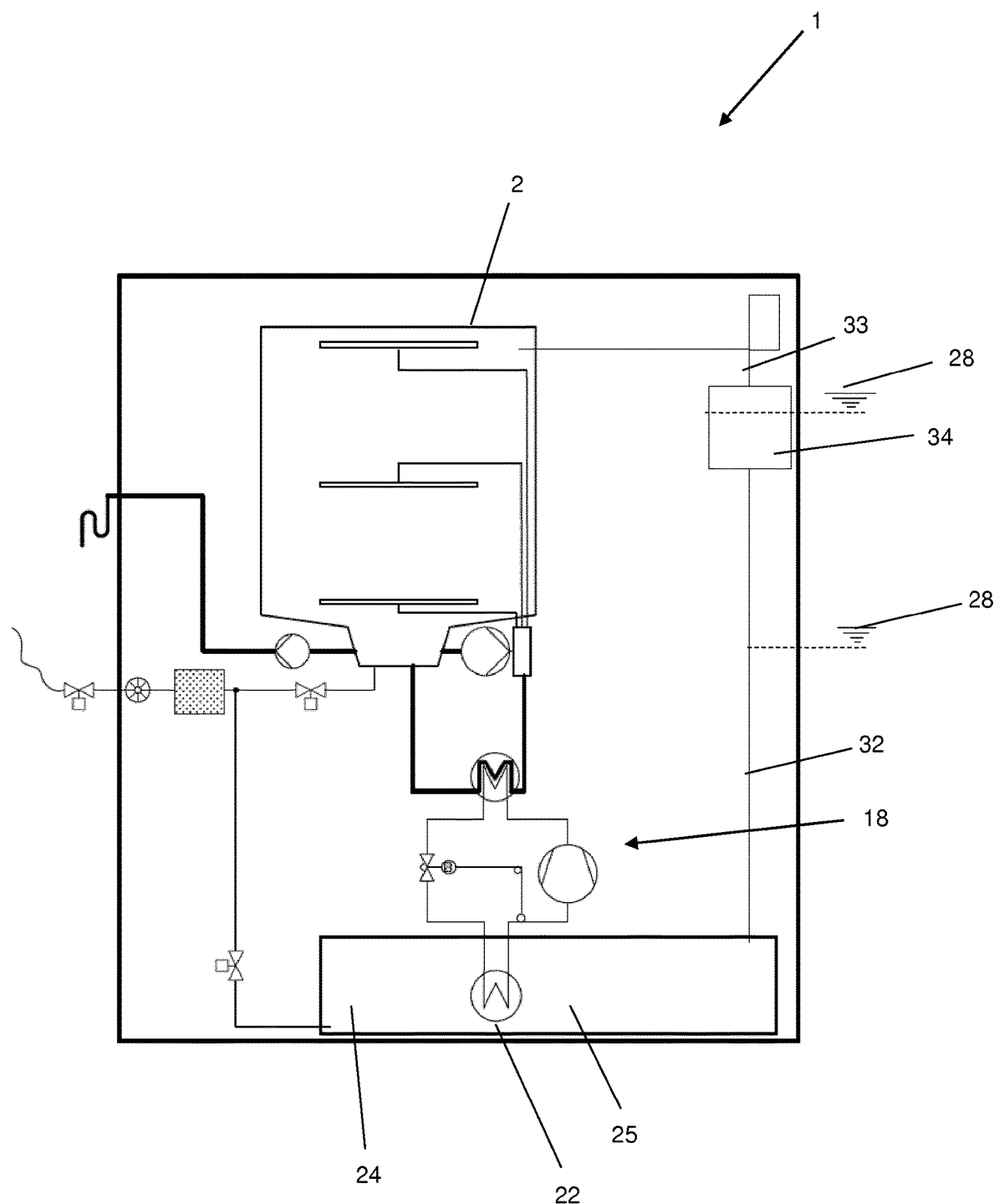

FIG. 7 shows an exemplary embodiment in which a fill level sensor 28 is positioned in the displacement line 32 between the heat storage medium tank 24 and the intermediate storage 34 and/or in which a fill level sensor 28 is located in the intermediate storage 34. The fill level sensor 28 or the fill level sensors can be designed, for example, as float switches or as optical sensors. These are connected to the control device of the cleaning device 1. Depending on the measurement signals of the sensor 28 or the sensors, the control device can determine a degree of icing of the heat storage medium tank 24 or at least detect the exceeding or falling below a predetermined degree of icing of the heat storage medium tank 24.

Preferably, the reaching or exceeding of a specified first fill level of the buffer store 34 can at least be detected by means of sensor 28. When this level is reached or exceeded, the control device preferably causes the automatic disconnection of the heat pump 18. Reaching this level corresponds to a displacement of a certain amount of the heat storage medium 25 from the heat storage medium tank 24 into the intermediate storage 34. This in turn results from a certain proportion of the heat storage medium 25 in the heat storage medium tank 24 which is in frozen form and thereby assumes an increased volume in the heat storage medium tank 24. When the predetermined first filling level in the intermediate storage 34 is reached, this proportion is such that an energy-efficient heating of the cleaning liquor by means of the heat pump 18 is no longer possible and/or that damage to one or more components of the cleaning device 1 is imminent. Preferably, at least the reaching or falling below of a specified second fill level in the intermediate storage 34 or in the displacement line 32 can alternatively or additionally be detected by means of a, preferably second, sensor 28. When this predetermined second fill level is reached or undershot, a previously switched-off heat pump 18 can be put into operation again, or a cleaning program can be selected again which provides a heat pump operation. The control device can be designed, in particular, to determine and/or signal optically or acoustically a point in time or a time period from which an operation of the heat pump 18 is possible again, depending on the measurement signals of the fill level sensor 28 or the sensors. In particular, the control device can also be configured to switch off the heat pump 18 as a function of the measurement signals of the fill level sensor 28 or the sensors or to allow it to be switched off in a wash program. In this case, an alternative heating device for heating the washing liquor is preferably used in the washing program. Due to the described filling level sensor 28 in the displacement line 32 and/or in the intermediate storage 34 a sensor system within the heat storage medium tank 24 which would be comparatively complex, error-prone and difficult to maintain, can be dispensed with.

Figure 8:
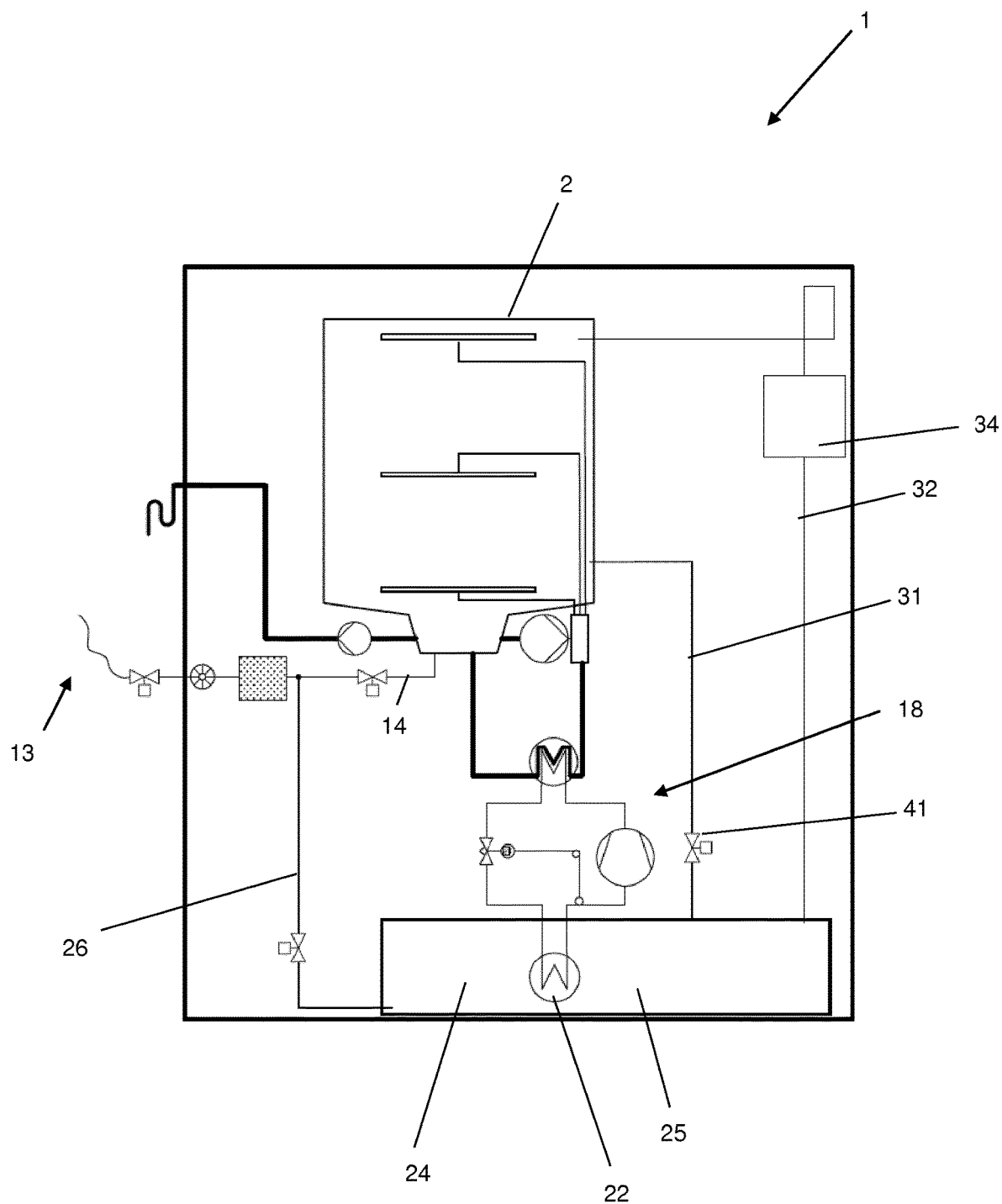

In the aforementioned exemplary embodiments, the heat storage medium tank 24 together with the intermediate storage 34 is designed as a "closed" system. In this case, the heat storage medium 25 contained is used only as an energy source for the heat pump 18, but is not intended for introduction into the cleaning chamber 3. In contrast, FIG. 8 shows a design with an "open" system. It differs from the above-mentioned exemplary embodiments substantially in that the heat storage medium tank 24 designed as a water tank connected to the cleaning container 2 in a fluidic manner via an overflow pipe 31 so that fresh water can be introduced from the water tank 24 into the cleaning container 2. The quantity of fresh water required for a cleaning program is completely or at least partially discharged from the water tank 24 into the cleaning container 2 via the overflow pipe 31. This can take place in that fresh water is admitted into the water tank 24 via the conduit 26 and thereby water previously stored therein is discharged via the overflow pipe 31. Alternatively, the water can be transferred from the water tank 24, for example by means of a pump, into the cleaning container via the overflow pipe 31 and the water tank 24 can subsequently be refilled with a corresponding quantity of fresh water from the fresh water connection 13 via the conduit 26.

In principle, it is thus possible to dispense with a further fresh water line 14 which connects the fresh water connection 13 to the cleaning container 2 bypassing the water tank 24. However, in the exemplary embodiment shown in FIG. 8 such a fresh water line 14 is present. In this way, it is possible for the fresh water inlet to take place selectively either via the fresh water line 14 or from the water tank 24 via the overflow pipe 31. The water tank 24 provides a large water reservoir. If the fresh water in the water tank 24 has ambient temperature in the water tank 24 due to a sufficiently long storage period in the water tank 24, for example 23° C., then the use of the fresh water from the water tank 24 for the water inlet in a cleaning program represents a considerable energy advantage over the use of fresh water which was obtained via the fresh water line 14 directly from the fresh water connection 13 and thus bypassing the water tank 24 (and typically has for example 15° C.). However, the situation is different if the water 25 in the water tank 24 is still very cold due to the operation of the heat pump 18 in a previously run cleaning step or a prior cleaning program. In this case, it is energetically more favorable if the water inlet via the fresh water line 14 takes place directly from the fresh water connection 13. A sensor device is thus configured to selectively carry out the fresh water inlet either via the fresh water line 14 or via the overflow pipe 31. The selection by the control device can take place in a time-controlled manner, for example, in particular, as a function of the time duration which has elapsed since the last-time operation of the heat pump 18. The selection may alternatively or additionally also take place in a temperature-controlled manner, in particular, depending on the temperature of the water 25 in the water tank 24. For this purpose, at least one sensor can be present which measures the temperature of the water 25 in the water tank 24 or a parameter dependent on the temperature of the water 25 in the water tank 24. A sensor can be positioned, in particular, in or on the water tank 24. However, as described in connection with FIG. 7, a level sensor 28 located in the overflow pipe 32 and/or in the intermediate storage 34 may also be present. In order to determine the temperature of the water 25 in the water tank 24, however, a temperature sensor which is located in the cleaning container 2, for example, in the collecting pot in the case of a dishwasher, and which is typically present anyway, can also be used. Initially, a first, small amount of water is first introduced into the cleaning container 2 from the water tank 24, a temperature measurement is then carried out by the temperature sensor, and subsequently the quantity of fresh water required for the pending cleaning program step still missing in the cleaning container 2 is introduced. The first quantity of water is a minimum quantity of water which is sufficient for performing the temperature measurement. The second quantity of water is likewise obtained from the water tank 24 when the temperature measurement exceeds a specified value, otherwise it is directly obtained from the fresh water connection 13 via the fresh water line 14. The second quantity of water is, in particular substantially larger than the first quantity of water, preferably many times larger.

After a water inlet has been carried out from the water tank 24 into the cleaning container 2, the water tank 24 is refilled with a corresponding quantity of fresh water from the fresh water connection 13 via the conduit 26. Furthermore, the overflow pipe 31 leading from the water tank 24 into the cleaning container 2 is preferably shut off. During a subsequent operation of the heat pump 18 in a cleaning step where the cleaning liquor is to be heated, icing of the water 25 in the water tank 24 can occur, as already described, as a result of which part of the water is displaced into the intermediate storage 34 via the displacement line 32. However, no water is displaced from the water tank 24 into the cleaning container 2. This can be prevented either by the shutoff valve 41 or by the formation of overflow pipe 31, displacement line 32 and intermediate storage 34 and/or their relative arrangement with respect to one another.

Figure 9:
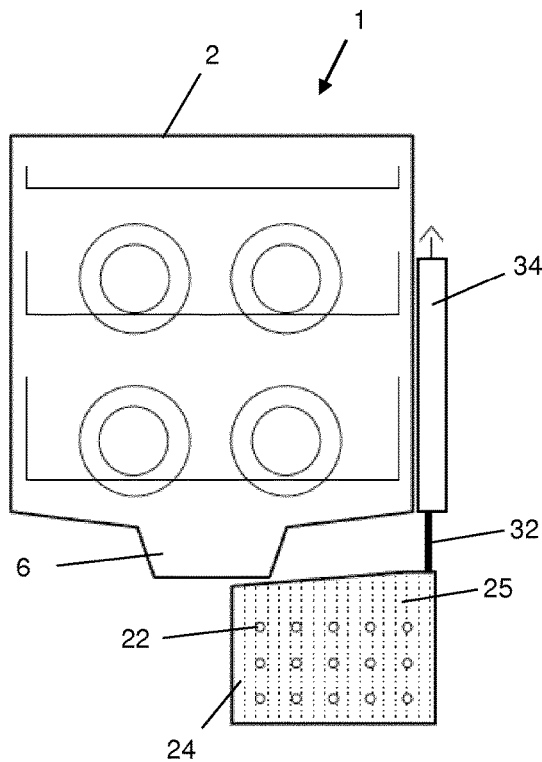
FIGS. 9 to 12 depict another exemplary embodiment of an equipped device according to the invention. Cleaning device in the embodiment as a dishwasher with representation of the process sequence according to the invention.
Figure 10:
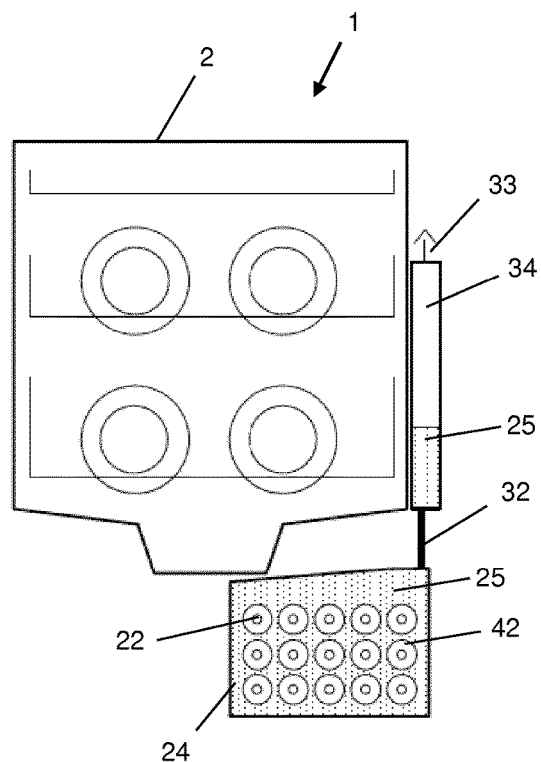
Figure 11:
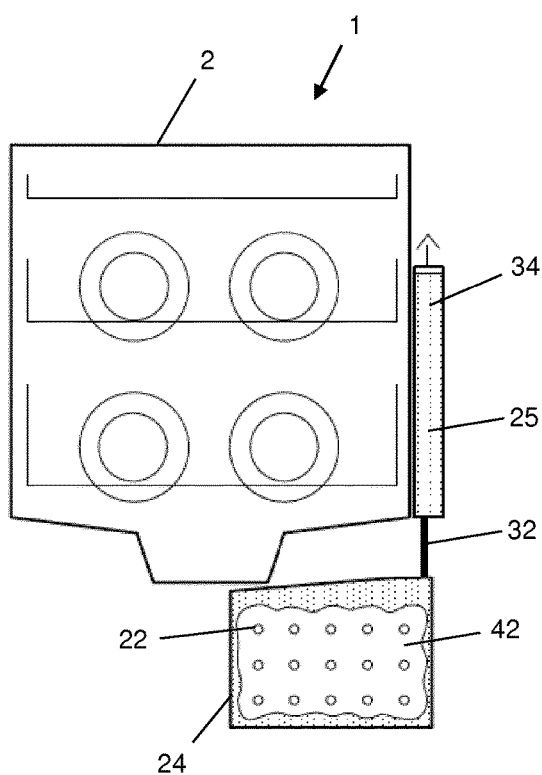
Figure 12:
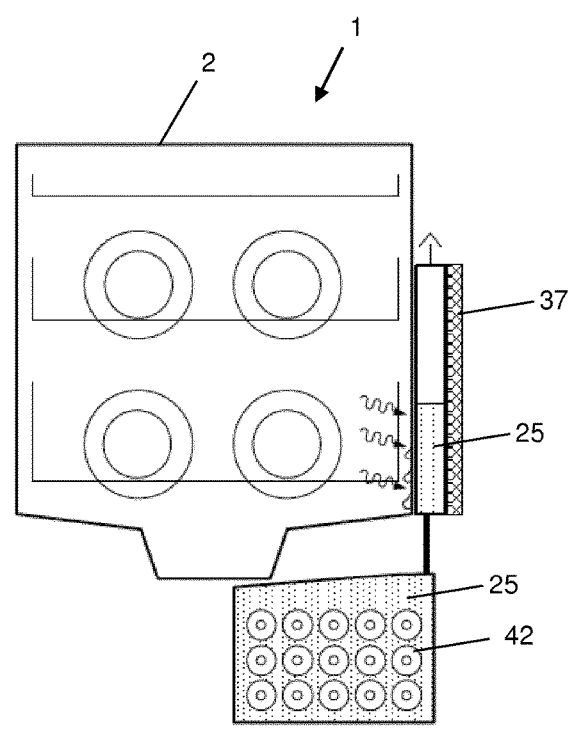

FIGS. 9 to 12 once again represent the basic principle of the invention and the arrangement of cleaning container 2, heat storage medium tank 24 and intermediate storage 34 in schematic cross-sectional drawings. The heat storage medium tank 24 is arranged below or substantially below the cleaning container 2 embodied here as a dishwasher. In this case, "substantially below" means that the heat storage medium tank 24 can also be positioned slightly laterally of the cleaning device 2, at least laterally of the collecting pot 6 of a dishwasher, but that the main part of the heat storage medium tank 24 is positioned underneath the cleaning container 2. The heat storage medium tank 24 optimally utilizes the space in the base of the cleaning device 2. An intermediate storage 34 is located above the heat storage medium tank 24 and preferably, as shown here, laterally or substantially laterally of the cleaning device 2. Before the start of a cleaning step in which the cleaning liquor is heated by operation of a heat pump 18, the heat storage medium tank 24 is completely or almost completely filled with heat storage medium 25 as shown in FIG. 9. The evaporator 22 of the heat pump 18 is arranged in the form of several coils in the heat storage medium tank 24. The intermediate storage 34 is unfilled in this initial state. When the heat pump 18 is in operation, the heat storage medium 25 is cooled in the heat storage medium tank 24 until the heat storage medium 25 solidifies or freezes. A gradually growing ice layer 42 is formed around the coils of the evaporator 22 for example, as shown in FIG. 10. Due to the volume expansion of the heat storage medium 25 in the heat storage medium tank 24 caused by the icing, a portion of the heat storage medium 25 is forced into the intermediate storage 34 via the displacement line 32. This may be continued until the contents of the heat storage medium tank 24 are solidified as shown in FIG. 11. The intermediate storage 34 is now at least almost full. After completion of the heat pump operation, the heat storage medium tank 24 or its contents gradually heats up, the melting ice and the resulting volume reduction of the heat storage medium tank contents allowing gravity-induced retention of the heat storage medium 25 temporarily stored in the intermediate storage 34, as shown in FIG. 12. With sufficient waiting time, the initial state of FIG. 9 is reached again. The intermediate storage 34 can be connected thermally conductively to a side wall of the cleaning container 2, in particular with its side surface directly against the side wall of the cleaning container 2. As a result, the intermediate storage 34 filled with cool heat storage medium 25 can, after operation of the heat pump 18, support a drying out of condensation within the cleaning chamber 3; on the other hand, the water 25 in the intermediate storage 34 is advantageously heated particularly effectively as indicated in FIG. 12 by the convoluted arrows. This also causes accelerated heating of the heat storage medium tank 24 and early reuse of the heat pump 18 is achieved. The intermediate storage 34 can also fit against the housing wall 36, not shown here, with the side facing away from the cleaning chamber 3 in order to achieve an improved heating of the heat storage medium 25 by thermal energy from the installation space of the cleaning device 2. Alternatively, however, as shown by way of example in FIG. 12, this side can also be equipped with insulation 37 in order to avoid a risk of condensation on the housing wall.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST

1 Cleaning device or dishwasher
2 Cleaning container or washing container
3 Cleaning room or rinsing chamber
4 Sprayer
5 Spray arm
6 Collection pot
7 Circulating pump
8 Water diverter
9 Conduit
10 Drain line
11 Pump
12 Drain
13 Fresh water connection
14 Fresh water line
15 Rotating vane meter
16 Softeners
17 Valve
18 Heat pump device
19 Condenser
20 Flow circuit
21 Compressor
22 Evaporator
23 Expansion element, for example throttle
24 Heat storage medium tank, e.g. water tank
25 Heat storage medium, e.g. water
26 Conduit
27 Valve
28 Level sensor
30 Flow circuit
31 Overflow pipe
32 Displacement line
33 Vent
34 Intermediate storage
35 Air gap
36 Housing
37 Insulation layer
38 First chamber
39 Second chamber
40 Conduit
41 Valve
42 Ice layer 43 Level sensor
44 Width direction
45 Height direction

The invention claimed is:

1. A cleaning device, comprising:
a cleaning container comprising a cleaning chamber and configured to accommodate cleaning material to be cleaned;
a heat pump device which has an evaporator arranged inside a heat storage medium tank and configured to cause an increase in a volume of a liquid heat storage medium received therein through partial freezing of the liquid heat storage medium so as to displace at least a portion of the liquid heat storage medium; and
an intermediate storage positioned above the heat storage medium tank, the intermediate storage being configured to receive at least the portion of the liquid heat storage medium displaced from the heat storage medium tank,
wherein the intermediate storage and the heat storage medium tank are arranged relative to one another such that at least the portion of the liquid heat storage medium that is displaced to the intermediate storage is returnable to the heat storage medium tank due to a gravitation force, and
wherein the heat storage medium tank is located at least partially below the cleaning container and the intermediate storage is arranged at least to a side of the cleaning container.

2. The cleaning device according to claim 1, wherein the heat storage medium tank has a volume of 3 to 7 liters, and/or
wherein the intermediate storage has a volume between 50 and 550 milliliters.

3. The cleaning device according to claim 2, wherein the heat storage medium tank has a volume of 3.5 to 5.5 liters, and/or wherein the intermediate storage has a volume between 250 and 450 milliliters.

4. The cleaning device according to claim 1, wherein the heat storage medium tank and the intermediate storage comprise one piece or are connected to one another via a displacement line.

5. The cleaning device according to claim 4, wherein in the intermediate storage a filling level sensor comprising a float switch or an optical sensor is located in the intermediate storage and/or in the displacement line.

6. The cleaning device according to claim 1, wherein a transfer of heat storage medium from the heat storage medium tank or the intermediate storage into the cleaning container is excluded.

7. The cleaning device according to claim 1, wherein the heat storage medium tank is connected in a fluidic manner to a fresh water supply and to an overflow pipe opening into the cleaning container, and
wherein the intermediate storage is integrated into the overflow pipe or located at an end of the displacement line.

8. The cleaning device according to claim 1, wherein the heat storage medium tank is connected in a fluidic manner to a fresh water supply while the intermediate storage is interconnected.

9. The cleaning device according to claim 1, wherein the intermediate storage has an insulation on its side facing the cleaning container.

10. The cleaning device according to claim 1, wherein the intermediate storage is thermally conductively connected to a housing of the cleaning device.

11. The cleaning device according to claim 1, wherein the cleaning device comprises a dishwasher.

12. The cleaning device according to claim 1, wherein the liquid heat storage medium that is displaced to the intermediate storage is returned to the heat storage medium tank due to liquefying of the partially frozen liquid heat storage medium in the heat storage medium tank.

13. A method for operating the cleaning device of claim 1, comprising:
using the cleaning container to provide the cleaning chamber
holding a heat accumulator medium in the heat storage medium tank; and
cooling the heat accumulator medium by operation of the heat pump device, which has an evaporator located in the heat storage medium tank, to such an extent that the heat storage medium partially freezes, such that a part of the heat storage medium is displaced from the heat storage medium tank into an intermediate storage.

14. The method according to claim 13, further comprising:
returning the displaced partial quantity of the heat storage medium to the heat storage medium tank, or
in a subsequent program step outside of the cleaning program or the cleaning program, replacing the displaced partial quantity of the heat storage medium to the heat storage medium tank due to force of gravity.

15. The method according to claim 13, further comprising:
carrying out a level measurement in the intermediate storage and/or in the displacement line, the carrying out the level measurement comprising sensing whether a predetermined water level in the intermediate storage and/or in the displacement line is reached or exceeded.

16. The method according to claim 15, wherein the carrying out the level measurement occurs immediately at a start of a wash program and/or at a beginning of a program step with a cleaning liquor to be heated.

17. The method according to claim 15, wherein, depending on the level measurement, the heat pump device is switched off or remains switched off in the washing program and/or a point in time or a time period after which operation of the heat pump device is possible again is determined and/or signaled optically or acoustically.

* * * * *